United States Patent
Chung et al.

(10) Patent No.: US 8,444,928 B2
(45) Date of Patent: *May 21, 2013

(54) SYSTEM FOR WASTEWATER TREATMENT

(75) Inventors: Jen-Chieh Chung, Taoyuan County (TW); Kou-Min Lin, Taoyuan County (TW); Ming-Hsin Wu, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 946 days.

This patent is subject to a terminal disclaimer.

(21) Appl. No.: 12/536,114

(22) Filed: Aug. 5, 2009

(65) Prior Publication Data

US 2010/0274068 A1    Oct. 28, 2010

(30) Foreign Application Priority Data

Apr. 28, 2009 (TW) ................................. 98113973 A

(51) Int. Cl.
*B01D 11/02* (2006.01)

(52) U.S. Cl.
USPC .......................................... 422/261; 588/900

(58) Field of Classification Search
USPC ........................... 422/261, 905, 140; 588/900
See application file for complete search history.

(56) References Cited

U.S. PATENT DOCUMENTS

| | | | |
|---|---|---|---|
| 4,604,214 A | 8/1986 | Carr et al. | |
| 5,820,761 A | 10/1998 | Holzer et al. | |
| 6,010,632 A | 1/2000 | Ross et al. | |
| 6,319,412 B1 | 11/2001 | Reyna | |
| 6,379,555 B1 | 4/2002 | Targosz | |
| 8,187,429 B2 * | 5/2012 | Chung et al. | 203/10 |

\* cited by examiner

*Primary Examiner* — Edward Johnson
(74) *Attorney, Agent, or Firm* — Morris Manning & Martin LLP; Tim Tingkang Xia, Esq.

(57) ABSTRACT

A method for treating waste water is provided, in which a wastewater is treated through a distilling process to obtain a distilled liquid, and then a reactant is added into the distilled liquid during the distilled liquid flowing to a liquid collecting tank, such that the reactant reacts with the distilled liquid by utilizing the residual temperature of the distilled liquid to form a processed liquid. Meanwhile, a system for wastewater treatment is also provided, which includes a distillation unit, a guiding unit, a means for adding the reactant, and a collecting unit. Since the present invention utilizes the residual temperature of the distilled liquid for the need of the reaction, an additional heat source is unnecessary, such that the consumption of energy can be greatly reduced.

10 Claims, 6 Drawing Sheets

SYSTEM FOR WASTEWATER TREATMENT

BACKGROUND OF THE INVENTION

1. Field of the Invention

The present invention relates to a wastewater treatment technique, in particular to a method and system for wastewater treatment, in which the residual temperature is utilized in the reaction with a reactant to reduce the consumption of energy.

2. Related Art

Generally, for the treatment of organic wastewater, a treatment technique that is technically effective and economically feasible must be selected according to the properties of base and contaminants, so as to achieve a better effect. According to the properties of the contaminants, the treatment methods are different, and taking the treatment of wastewater containing organic contaminants as an example, many commonly used single treatment techniques can be used. Based on the features of the treatment techniques, they can be summarized as: (1) biological treatment, such as, bacteria decomposition; (2) chemical treatment, such as, chemical precipitation and oxidative decomposition; (3) thermal treatment, such as, incineration and plasma treatment; and (4) physical treatment, such as, filtration and separation. If further summarized according to the state of organic contaminants in the wastewater after treatment, in the treatment methods (1), (2), and (3), the organics in the wastewater are directly decomposed or broken down into non-toxic and decomposable organics, or the chemical structure is completely decomposed or broken down into carbon dioxide, water, and inorganics, for example, as described in U.S. Pat. No. 5,820,761, U.S. Pat. No. 6,010,632, and U.S. Pat. No. 4,604,214, which utilize wet oxidation, supercritical water oxidation, and Fentons reagent oxidation to decompose or break down the organic components in the wastewater, respectively, and are invention applications of such a treatment mode. This treatment mode has the advantage that the organic contaminants can be decomposed into $CO_2$, $H_2O$, and other low-molecular substances (such as, acids, or simple hydrocarbons) effectively through a high-temperature, high-pressure reaction or oxidation initiated by OH free radical. However, it is necessary to remove the added chemical reagents to avoid the generation of secondary wastewater, and prevent from being decomposed into more toxic organics during the reaction.

As to the treatment method (4), the organic components that are difficult to decompose and have high toxicity are separated from the wastewater by separation method, thus making the wastewater meet the requirements of the discharge standard. During the treatment, no changes in the structure of the organics occur, for example, as described in U.S. Pat. No. 6,319,412 and U.S. Pat. No. 6,379,555, which disclose use of fixed-bed activated carbon adsorption to remove the organic components in wastewater, and then further treatment with other methods, and are invention applications of such a treatment mode. The main advantage of this treatment mode is that no chemicals is added, thus avoiding the problem of secondary wastewater, and the concentrated liquid or sludge obtained by separation is significantly reduced in volume, and can be further treated by incineration or solidification.

In recent years, due to the rapid development of science and technology, wastewaters from different industries get more diversified and may contain complex and non-biodegradable compounds, thus single treatment technique cannot solve the problem completely. If a wastewater contains various high-boiling point organics simultaneously, and the water content is high, then the treatment will get more difficult. As for the current high-tech industry, such as, semiconductor manufacturing, various wastewaters can be generated in the processes, for example, wafer cleaning wastewater, photoresist removal wastewater, wet etching wastewater, polishing wastewater, cutting wastewater, exchange medium or adsorbent regeneration wastewater. Taking wastewater from the condensed liquid of volatile organic compound (VOC) waste gas treatment system and zeolite adsorbent regeneration during the photoresist removal process as example, it mainly contains high-boiling point organic solvents, such as, dimethyl sulfoxide (DMSO), monoethanol amine (MEA), and N-methyl pyrrolidone (NMP), and small amount of low-boiling point organic solvents, such as, isopropyl alcohol (IPA) and acetone, and the total organic carbon (TOC) concentration is about 8,000~16,000 mg/L. Generally, the wastewater is temporarily stored in the factory or treated by incineration by authorizing substitute wastewater treatment enterprise in the industry. However, as the water content is extremely high (>90%), directly incineration will increase both the energy consumption and the discharge of carbon dioxide, thus resulting in another environmental protection problem.

For another example, in the material manufacturers, after the heat treatment of plastic sleeve, the wastewater generated by cleaning the sleeve wall contains ethylene glycol (b.p.=197.6) component used as heat medium, with an average concentration of about 0.06M. As the water content is high and the amount of the wastewater is great, with the consideration of the treatment cost, the incineration is not suitable. In the case of biological treatment, as the growth and culture of microorganisms are in very harsh environment, difficult to control, and need a long time, the biochemical oxygen demand (BOD) concentration of the wastewater after the treatment will often exceed the standard value in the regulations of environmental protection.

In prior art, distillation is mostly used to treat wastewater containing various organics, in which a distilled liquid is first generated, and next the distilled liquid is collected into a collecting tank. As organic substances still remain, the distilled liquid does not meet the requirements of the discharge standard. In order to decrease the organic carbon content, the distilled liquid will be further treated by other methods to meet the requirements of the discharge standard, for example, by secondary distillation, or biological treatment, or $UV/O_3$ treatment, to further decrease the TOC in the distilled liquid. Although this can address the above demand in the industry, multiple distillations will consume more energy. Moreover, for biological treatment or $UV/O_3$ treatment, the equipment cost is high, and the treatment time is very long, and as a result, the economic effect is low.

Therefore, there is still a need for a new system and method for wastewater treatment to reduce the treatment cost, improve the treatment efficiency, and simplify the treatment process, in order to meet the demand in the industry.

SUMMARY OF THE INVENTION

The present invention is directed to a method and system for wastewater treatment, in which organics in a wastewater are separated by a physical method, and then the liquid generated by the separation is reacted with an added reactant by utilizing the residual temperature of the liquid, so as to remove organic substances remaining in the separated liquid, thus reducing the organic carbon content in the separated liquid. By means of the mechanism of utilizing the residual temperature, not only the organic carbon content can be effectively reduced, but also the energy to be consumed by secondary distillation can be reduced, so as to reduce the treatment cost of the wastewater.

In an embodiment, a method for wastewater treatment is provided. The method includes: treating a wastewater through a distilling process to obtain a distilled liquid; and, during the distilled liquid flowing to a collecting tank, adding a reactant, such that the reactant reacts with the distilled liquid by utilizing the residual temperature of the distilled liquid, to form a processed liquid.

In another embodiment, a system for wastewater treatment is provided. The system includes: a distillation unit, for distilling a wastewater to form a distilled liquid; a guiding unit, connected to the distillation unit for guiding the distilled liquid; a reactant adding unit, connected to the guiding unit, for adding a reactant during the guiding unit guiding the distilled liquid, such that the reactant reacts with the distilled liquid by utilizing the residual temperature of the distilled liquid, to form a processed liquid; and, a collecting unit, connected to the guiding unit, for receiving the processed liquid.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

In order to make the examiner to further know and understand the features, objects, and functions of the present invention, the relevant detailed structure of the apparatus and design concept and reason of the present invention will be explained below, such that the examiner can understand the characteristics of the present invention. The detailed description is as follows.

Figure 1:
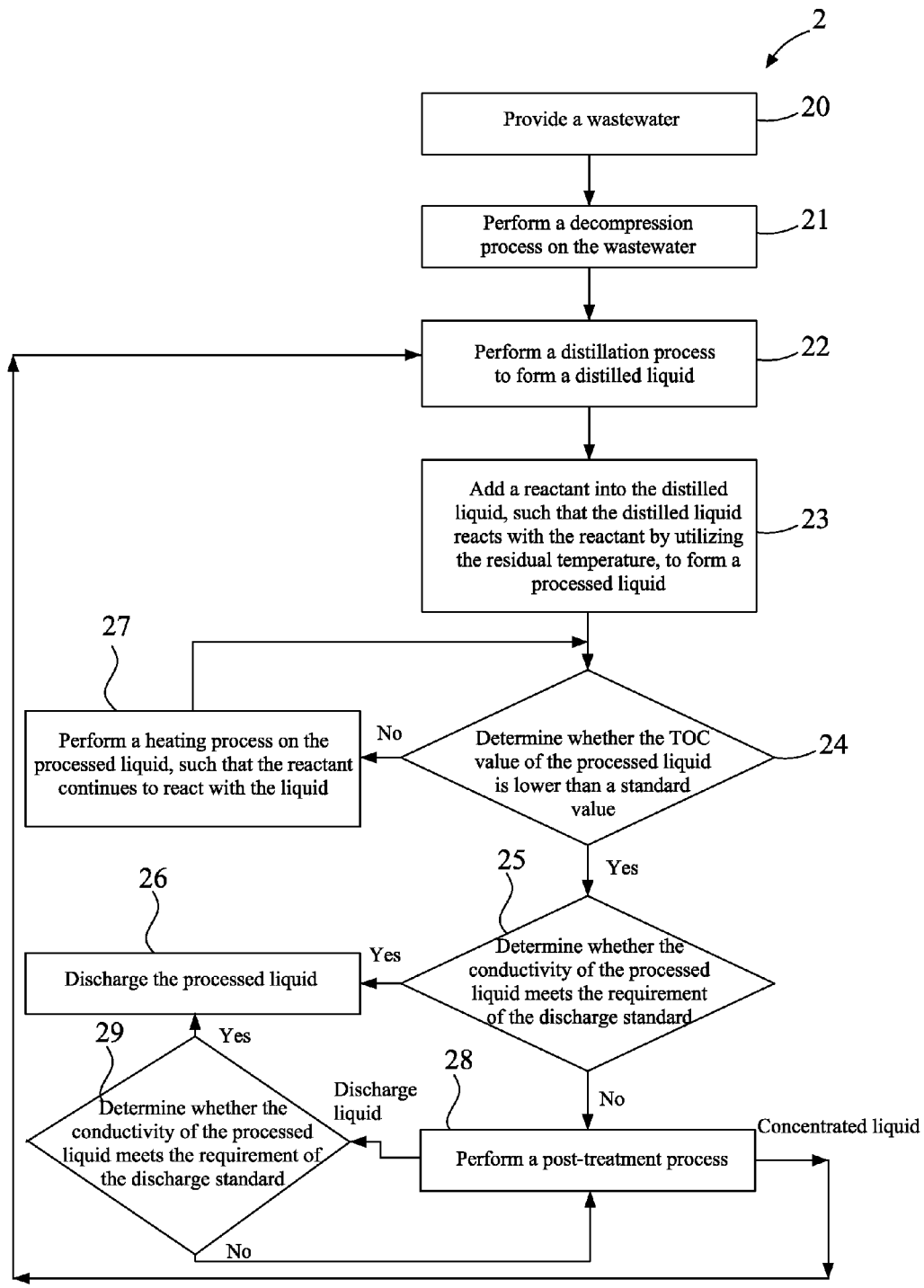
FIG. 1 is a schematic flow chart of a method for wastewater treatment of the present invention.

FIG. 1 is a schematic flow chart of a method for wastewater treatment of the present invention. Referring to FIG. 1, the method includes the following steps. First, a wastewater is provided in Step 20. In this embodiment, the wastewater may contain various organic components at the same time, for example, but not limited to, wafer cleaning wastewater, photoresist removal wastewater, wet etching wastewater, polishing wastewater, cutting wastewater, exchange medium or adsorbent regeneration wastewater. Next, a decompression process is performed on the wastewater in Step 21. The decompression process is performed such that a negative pressure is provided in the treatment environment of the wastewater. And then, a distillation process is performed on the wastewater in Step 22, to form a distilled liquid. The foregoing Step 21 is optional and not necessary. The sequence of Steps 21 and 22 is not limited to one shown in FIG. 1.

When the wastewater is distilled to generate a distilled liquid, as the wastewater of the present invention contains various organic components at the same time, the distilled liquid may have residual organic components therein, such that the total carbon content (TOC) of the distilled liquid is too high. Due to condensation of the distilled liquid, the temperature of the distilled liquid has been decreased, but when the distilled liquid is just formed, the temperature can generally be maintained at about 65 to 85 In order to reduce the TOC value effectively, according to the present invention, in Step 23, before the distilled liquid flows into the collecting tank, a reactant capable of reducing the TOC value is added, such that the reactant can react with the distilled liquid by utilizing the residual temperature of the distilled liquid to form a processed liquid, before the distilled liquid flows into the collecting tank. In this embodiment, the reactant is a peroxide, for example, but not limited to, sodium persulfate ($Na_2S_2O_8$). In this embodiment, $Na_2S_2O_8$ is a strong oxidant and is capable of damaging organic components in the liquid at a temperature above 60 to decrease the TOC value of the liquid. As $Na_2S_2O_8$ is added into the flow path of collecting the distilled liquid in Step 23, the reaction is carried out at the residual temperature of the distilled liquid of about 65 to 85, thus the TOC value of the distilled liquid can be effectively decreased.

Figure 2:
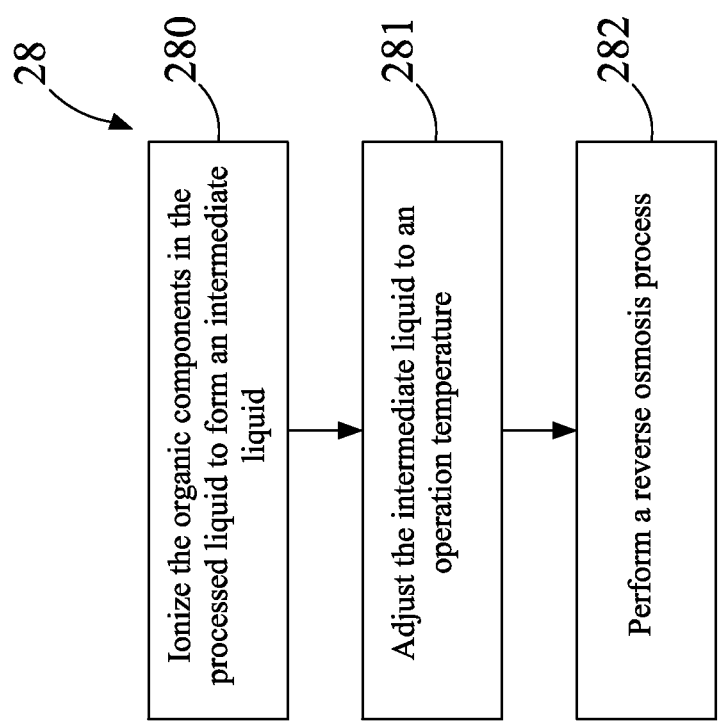
FIG. 2 is a schematic flow chart of a post-treatment process according to an embodiment of the present invention.

Next, the TOC value of the processed liquid is determined in Step 24. If the TOC value is greater than a standard value, it indicates that the TOC value is still too high, and the process liquid is heated again in Step 27 to raise the temperature of the processed liquid. As at this point, the temperature of the processed liquid is still maintained above 35, only a little heat is needed to raise the temperature of the processed liquid to the required value, such that the previously added reactant can continue to react with the processed liquid, and as a result, the TOC value can meet the requirement of the discharge standard. Otherwise, if the TOC value is lower than the discharge standard, then whether the conductivity value of the processed liquid is lower than the discharge standard is further determined in Step 25. If yes, it indicates that the processed liquid can be discharged into the drainage system, and the processed liquid is discharged in Step 26. Otherwise, if no, it indicates that the processed liquid needs to be further treated to decrease the conductivity value. In this embodiment, a post-treatment process can be performed on the processed liquid in Step 28 to decrease the conductivity value. Referring to FIG. 2, a schematic flow chart of a post-treatment process according to an embodiment of the present invention is shown. In this embodiment, the post-treatment process includes the following steps. In Step 280, an ionization process is performed to ionize the organic components in the processed liquid to form an intermediate liquid. The ionization process includes a pH adjusting process to adjust the processed liquid to be a suitable pH value of about pH6 to pH9. When the pH value of the processed liquid is greater than 9, it is adjusted to be lower than 9, and the organic components in the processed liquid are thus ionized; when the pH value of the processed liquid is lower than 6, it is adjusted to be greater than 6, and the organic components in the processed liquid are thus ionized. Next, the intermediate liquid is adjusted to an operation temperature of lower than about 40 in Step 281. Then, a reverse osmosis process is performed to generate a discharge liquid and a concentrated liquid in Step 282. For the discharge liquid, the conductivity is detected in Step 29. If the conductivity of the discharge liquid is greater than the standard value, return to Step 28 to perform the post-treatment process again. Otherwise, if the conductivity of the discharge liquid meets the requirement of the discharge standard, the discharge liquid is discharged in Step 26. For the concentrated liquid generated in Step 28, the distillation process of Step 22 is performed again, and then the processes after Step 23 are repeated, which are as described previously and will not be described again here.

Figure 3:
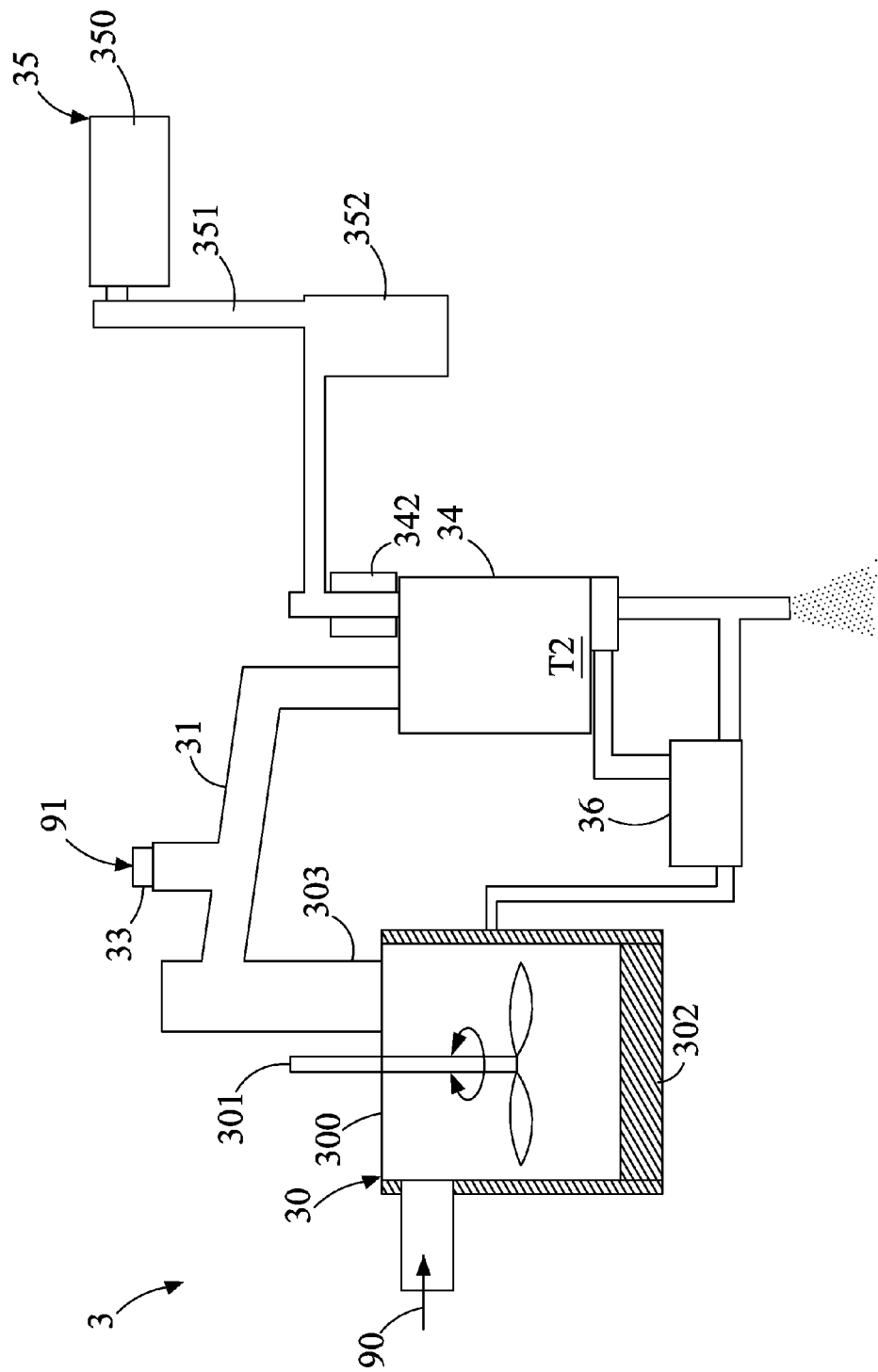
FIG. 3 is a schematic view of a system for wastewater treatment according to an embodiment of the present invention.

In order to achieve the method, as shown in FIG. 3, the present invention further provides a system for wastewater treatment 3, including: a distillation unit 30, a guiding unit 31, a reactant adding unit 33, and a collecting unit 34. The distillation unit 30 is used to distill a wastewater 90 to form a distilled liquid. In this embodiment, the distillation unit 30 further has an evaporation tank 300 for accommodating the wastewater 90. A stirring unit 301 is disposed inside the evaporation tank 300, for stirring the wastewater 90. A heating portion 302 is disposed peripherally around the evaporation tank 300A, for heating the wastewater therein. After the wastewater is heated to raise its temperature, the water contained therein will be evaporated as gas. A mist separation portion 303 is disposed at a side of the evaporation tank 300, for collecting the evaporated gas generated when the evaporation tank 300 is heated.

Figure 4:
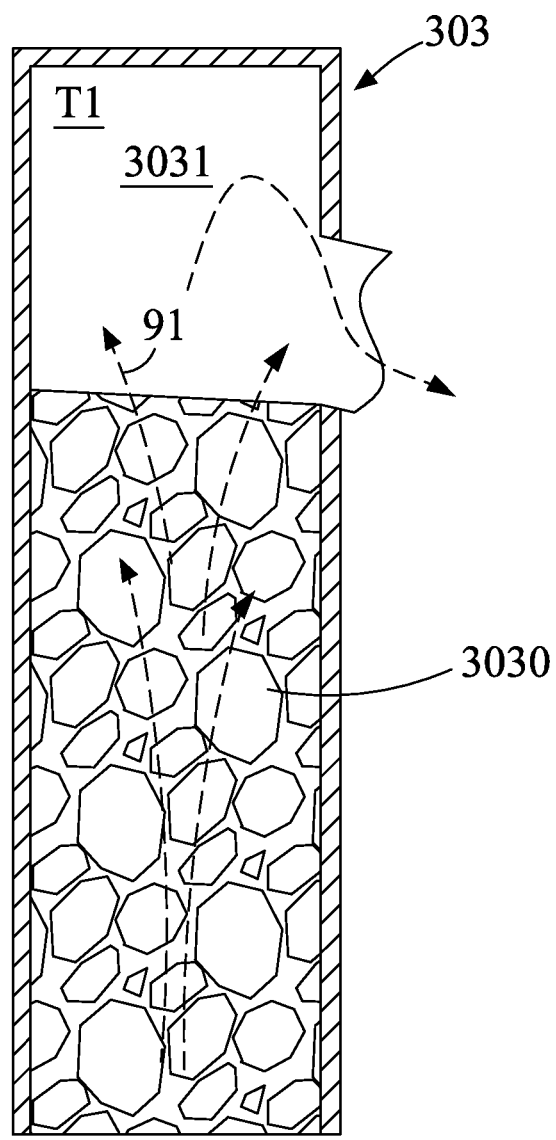
FIG. 4 is a schematic view of a mist separation portion of the present invention.

As shown in FIG. 4, a schematic view of a mist separation portion of the present invention is shown. The mist separation portion 303 further has a plurality of mist separation structures 3030 therein, which can be, for example, but are not limited to, glass particles or glass sleeves. The disposition of the mist separation structures 3030 is because the evaporated gas 91 generally contains low-boiling point organic substances. In order to reduce ascending of the gas of the organic substances along with the evaporated vapor, the mist separation structures are disposed to block the ascending of the gas, and on the other hand, during the ascending of the gas, the mist separation structures 3030 absorb the heat, such that the low-boiling point organic gas is cooled to return to liquid state, thus flows back into the evaporation tank 300. The number of the mist separation structures 3030 disposed can be determined according to the requirement. Generally, if the number is too large, the water vapor will be easily condensed into water and flows back to the evaporation tank 300; if the number is too small, the condensation of the organic evaporated gas cannot be achieved. Therefore, the number is determined according to the temperature required to be maintained in the upper area 3031 of the mist separation portion 303. In this embodiment, the temperature required by the area 3031 is 85.

Figure 5:
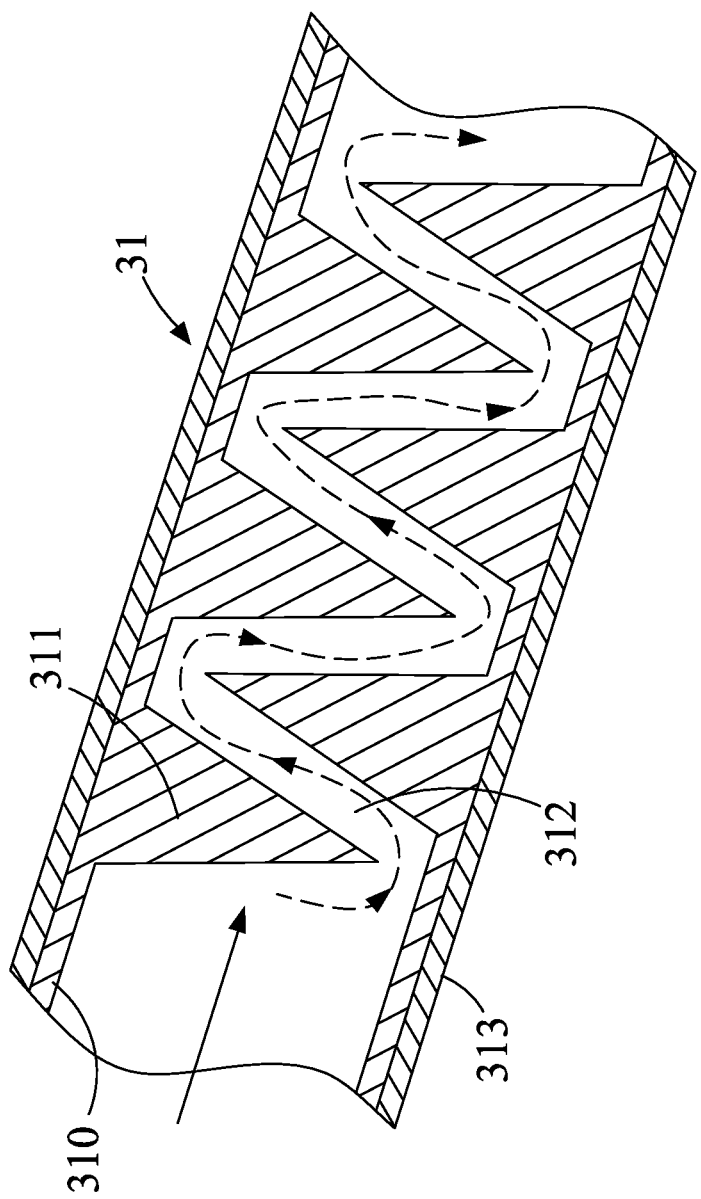
FIG. 5 is a schematic cross-sectional view of a guiding unit according to an embodiment of the present invention.

Referring to FIG. 3 again, the guiding unit 31 is connected to the mist separation portion 303 in the distillation unit 30. The evaporated gas passes through the mist separation portion 303 and enters the guiding unit 31 to form the distilled liquid, and is guided by the guiding unit 31 into the collecting unit 34. As shown in FIG. 5, a schematic cross-sectional view of a guiding unit 31 according to an embodiment of the present invention is shown. In this embodiment, the guiding unit is a tube 310, which has a plurality of blocking elements 311 therein. The blocking elements 311 are distributed inside the guiding unit 31 in a staggered manner, such that a flow path 312 is defined in the guiding unit 31. Furthermore, in order to maintain the temperature of the distilled liquid flowing in the guiding unit (about 65 to 85), a heat insulation layer 313 is coated on the outer wall of the guiding unit 31, to avoid the heat exchange between the guiding unit 31 and the external environment, so as to maintain the temperature of the distilled liquid in the guiding unit 31. As shown in FIG. 3, a reactant adding unit 33 is connected to a side of the guiding unit 31, for adding a reactant during the guiding unit 31 guiding the distilled liquid. The reactant is capable of decreasing the TOC value of the distilled liquid, and can be, for example, a peroxide, and in this embodiment, is sodium persulfate ($Na_2S_2O_8$).

As the distilled liquid is still maintained at a certain temperature in the guiding unit 31, it can react with the peroxide during flowing. Furthermore, the disposition of the blocking elements extends the flow time of the distilled liquid in the guiding unit 31, such that the distilled liquid can react with the peroxide for a sufficient time to form a processed liquid. A collecting unit 34 is further disposed at a side of the guiding unit 31, for receiving the processed liquid. By means of the arrangement, the TOC value of the processed liquid collected by the collecting unit 34 has been reduced significantly, and meets the requirement of the discharge standard and can be directly discharged. As such, the problem in prior art can be solved, that is, secondary heating and distillation is required, resulting in additional energy consumption and thus increased wastewater treatment cost. In order to improve the guiding, flowing, and collecting effects of the distilled liquid, the collecting unit 34 has a cooling element 342 at a side thereof, for fully cooling a small amount of residual water vapor to make it flow back into the collecting unit, and then connected to a decompression unit 35 through the cooling element. In this embodiment, the cooling element 342 is a condensing tube. Further, the decompression unit 35 includes a negative pressure element 350, a pipeline 351, and a relay tank 352. The relay tank 352 is connected to the collecting unit 34, and the negative pressure element 350 is connected to the relay tank 352 through the pipeline 351. The negative pressure element 350 (for example, suction pump) applies a negative pressure through the pipeline 351 and the relay tank 352, such that the evaporated gas in the mist separation portion 303 and the distilled liquid in the guiding unit 31 can successfully flows into the collecting unit 34. The relay tank 352 is used to avoid the water flowing into the negative pressure element 350 due to the negative pressure, thus influencing the operation of the negative pressure element 350. Therefore, by means of the disposition of the relay tank 352, the liquid is collected in this area.

Figure 6:
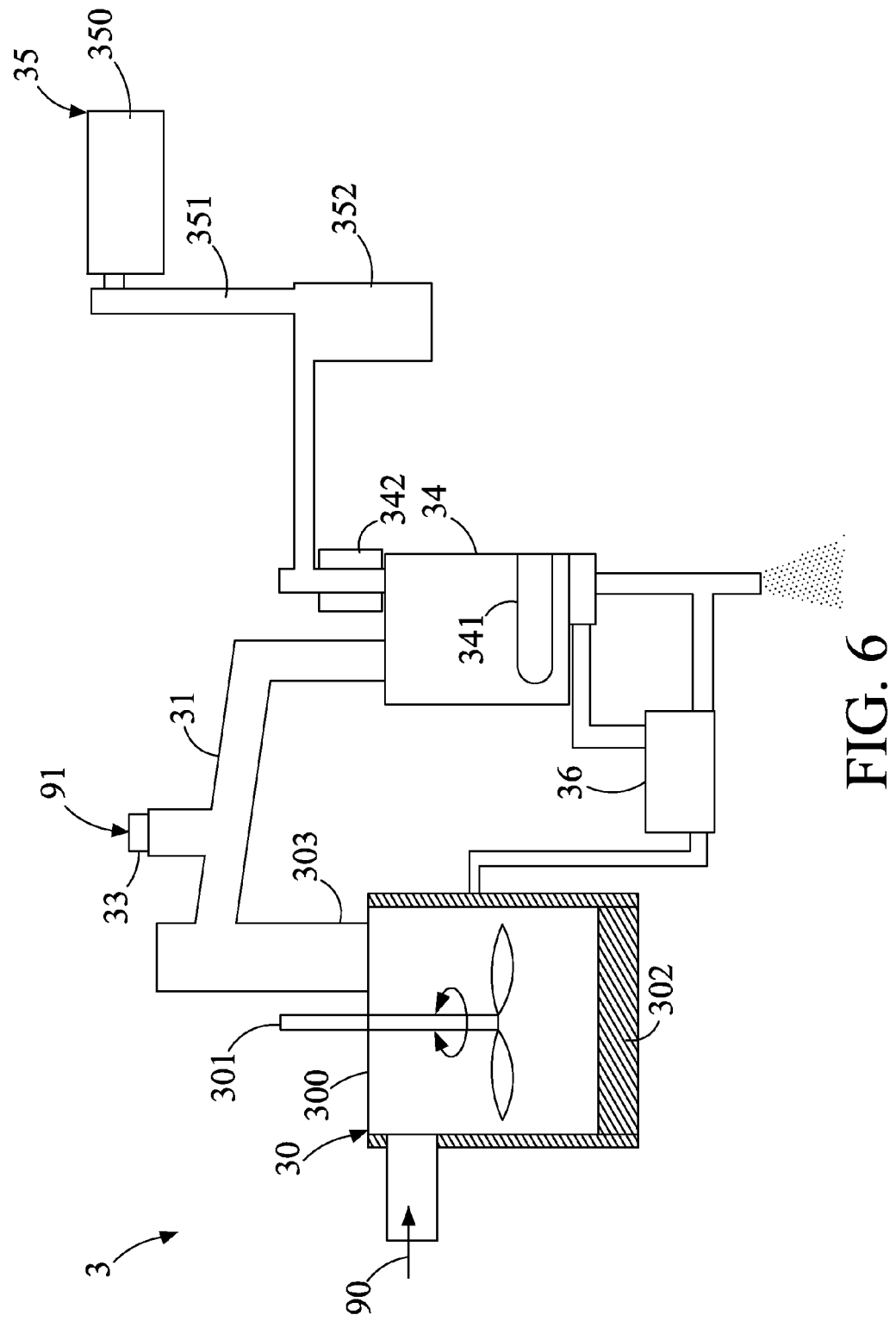
FIG. 6 is a schematic view of a system for wastewater treatment according to another embodiment of the present invention.

Furthermore, in FIG. 3, a post-treatment unit 36 is further disposed at a side of the collecting unit 34, for performing the treatment process in FIG. 2. That is, when the conductivity of the processed liquid collected in the collecting unit 34 does not meet the requirement of the discharge standard, the processed liquid in the collecting unit 34 will be guided into the post-treatment unit 36, to be subjected to the treatment process of ionization and reverse osmosis, in order to decrease the conductivity of the processed liquid to meet the requirement of the discharge standard. Further, as shown in FIG. 6, a schematic view of a system for wastewater treatment according to another embodiment of the present invention is shown. In this embodiment, the system is substantially the same as that in FIG. 3, and the difference therebetween is that the collecting unit 34 further has a heat unit 341 therein, for heating the processed liquid. The heating unit 34 takes charge of performing Step 27 in FIG. 1, that is, when the TOC value of the processed liquid is greater than the standard value, the processed liquid is heated by the heating unit 34, such that the temperature of the processed liquid is raised to above 70, allowing the processed liquid to further react with the added peroxide to decreases the TOC valve of the processed liquid.

Embodiments

Referring to Table 1, the change in TOC concentration in the collecting unit with time without adding any reactant is shown. In the implementation conditions in Table 1, the flow rate of the wastewater entering the reduced pressure distillation unit is 1.68 ml/min, the temperature of the mist separation portion (T1, as shown in FIG. 4) is 85, the collecting unit is not heated, and no reactant is added to react with the distilled liquid.

TABLE 1

| Time (min) | $F_{TOC}$ (ppm) | $D_{TOC}$ (ppm) | $D_r$ (%) | $V_D$ (ml) | T1 ( ) |
|---|---|---|---|---|---|
| 0 | 15210 | 0.0 | 0.00 | 0 | 22 |
| 60 | 15210 | 105.0 | 0.69 | 70 | 85 |
| 120 | 15210 | 84.0 | 0.55 | 120 | 85 |
| 180 | 15210 | 83.0 | 0.55 | 190 | 85 |
| 240 | 15210 | 82.0 | 0.54 | 260 | 85 |

$F_{TOC}$ (ppm) is the TOC concentration of the wastewater, and $D_{TOC}$ (ppm) is the TOC concentration of the processed liquid. $V_D$ (ml) is the volume of the processed liquid. $D_r$ (%) represents the TOC residual percentage of the processed liquid. It can be seen from the condition that the TOC concentration in the $D_{TOC}$ (ppm) column increases with time, that without adding a reactant, the TOC concentration of the processed liquid collected by the collecting unit does not decrease with time.

Referring to Table 2, change in the TOC value when a reactant is added is shown. T1 is the temperature of the distilled liquid collected in upper area of the mist separation portion, and T2 is the temperature in the collecting unit. The flow rate of the $Na_2S_2O_8$ added is in the range of 0.1 to 0.2 mL/min. It can be found from Table 2 that the TOC value of the processed liquid in the collecting unit gradually decreases with time. The reason is in that the added reactant reacts with the distilled liquid by utilizing the residual temperature of the distilled liquid, thus decreasing the TOC value of the liquid gradually.

TABLE 2

| Time (min) | $F_{TOC}$ (ppm) | $D_{TOC}$ (ppm) | $D_r$ (%) | T1 ( ) | T2 ( ) | Remark |
|---|---|---|---|---|---|---|
| 0 | 15125 | 0.0 | 0.00 | 27 | 27 | $Na_2S_2O_8$ (0.2 mL/min) |
| 60 | 15125 | 52.0 | 0.34 | 85 | 35 | $Na_2S_2O_8$ (0.1 mL/min) |
| 120 | 15125 | 40.0 | 0.26 | 85 | 35 | |
| 180 | 15125 | 30.0 | 0.20 | 85 | 36 | |

Referring to Table 3, change in the TOC value when the reactant is added and the collecting unit is heated is shown. T2 is increased from 35 to 70. The flow rate of $Na_2S_2O_8$ added is in a range of 0.1 to 0.2 mL/min. It can be found from Table 3 that, the TOC value of the processed liquid in the collecting unit decreases with time at a higher rate compared to that of the collecting unit not being heated in Table 2. This is because the added reactant reacts with the distilled liquid by utilizing the residual temperature of the distilled liquid, and the temperature of the collecting unit is increased to 70, such that the reactant can not only react with the distilled liquid in the guiding unit, but also react with the liquid in the collecting unit, thereby the TOC value of the liquid in the collecting unit is decreased significantly.

TABLE 3

| Time (min) | $F_{TOC}$ (ppm) | $D_{TOC}$ (ppm) | $D_r$ (%) | T1 ( ) | T2 ( ) | Remark |
|---|---|---|---|---|---|---|
| 0 | 15410 | 0.0 | 0.00 | 27 | 27 | $Na_2S_2O_8$ (0.2 mL/min) |
| 60 | 15410 | 26.0 | 0.17 | 85 | 70 | $Na_2S_2O_8$ (0.1 mL/min) |
| 120 | 15410 | 10.5 | 0.07 | 85 | 70 | |
| 180 | 15410 | 8.6 | 0.06 | 85 | 70 | |
| 240 | 15410 | 5.2 | 0.03 | 85 | 70 | |

The above description is merely preferred embodiments of the present invention, and is not intended to limit the scope of the present invention. Therefore, alternations and modifications can be made according to the claims of the present invention, without departing from the principle of the present invention and the spirit and scope of the present invention, and shall be considered as further embodiments of the present invention.

In view of the above, the method and system for wastewater treatment of the present invention have the advantages of low energy consumption and high treatment speed, thus being capable of decreasing the TOC value effectively, and greatly improving the environmental protection effect of the wastewater treatment. Therefore, the present invention can improve the competitiveness of the industry and promote the development of peripheral industries, thus meeting the requirements for applying for a patent for invention as defined in the patent law. Therefore, the present application is filed for patent invention according to the patent law. Please examine the application and grant it as a formal patent for protecting the rights of the inventor.

What is claimed is:

1. A system for wastewater treatment, comprising:
   a distillation unit, for distilling a wastewater to forming a distilled liquid;
   a guiding unit, connected to the distillation unit for guiding the distilled liquid;
   a reactant adding unit, connected to the guiding unit, for adding a reactant during the guiding unit guiding the distilled liquid, in which the reactant reacts with the distilled liquid by utilizing the residual temperature of the distilled liquid to form a processed liquid;
   a collecting unit, connected to the guiding unit, for receiving the processed liquid.

2. The system for wastewater treatment according to claim 1, wherein the reactant is a peroxide.

3. The system for wastewater treatment according to claim 2, wherein the peroxide is sodium persulfate ($Na_2S_2O_8$).

4. The system for wastewater treatment according to claim 1, wherein the collecting unit further has a decompression unit connected thereto, for providing negative pressure, such that the distillation unit effects reduced pressure distillation.

5. The system for wastewater treatment according to claim 1, wherein the distillation unit has a heating portion and a mist separation portion, with the mist separation portion being connected to the guiding unit.

6. The system for wastewater treatment according to claim 5, wherein the mist separation portion is a structure filled with a plurality of glass particles or glass sleeves.

7. The system for wastewater treatment according to claim 1, wherein the collecting unit comprises a cooling element, connected to the decompression unit.

8. The system for wastewater treatment according to claim 7, wherein the cooling element is a condensing tube.

9. The system for wastewater treatment according to claim 1, wherein the guiding unit further comprises a heat insulation structure coated thereon.

10. The system for wastewater treatment according to claim 1, wherein the guiding unit further comprises a blocking element therein for extending the flow path of the distilled liquid.

* * * * *